(12) United States Patent
Matsumoto et al.

(10) Patent No.: US 12,467,518 B1
(45) Date of Patent: Nov. 11, 2025

(54) PLANETARY GEAR MECHANISM

(71) Applicant: TOYOTA JIDOSHA KABUSHIKI KAISHA, Toyota (JP)

(72) Inventors: Takeshi Matsumoto, Toyota (JP); Masanori Sakai, Nagoya (JP); Yoshito Sekiguchi, Kariya (JP); Jun Kamitake, Toyota (JP); Takeyoshi Horibe, Hekinan (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/073,705

(22) Filed: Mar. 7, 2025

(30) Foreign Application Priority Data

Aug. 2, 2024 (JP) .................................. 2024-126500

(51) Int. Cl.
*F16H 1/48* (2006.01)
(52) U.S. Cl.
CPC ...................................... *F16H 1/48* (2013.01)

(58) Field of Classification Search
CPC ....... F16H 1/48; F16H 57/028; F16H 57/0006
See application file for complete search history.

(56) References Cited

U.S. PATENT DOCUMENTS 11,614,146 B2 * 3/2023 Lettow .................. F16H 57/082
475/331

FOREIGN PATENT DOCUMENTS

JP 2010159835 A * 7/2010 ............. F16H 55/20

* cited by examiner

*Primary Examiner* — Huan Le
(74) *Attorney, Agent, or Firm* — SoraIP, Inc.

(57) ABSTRACT

A planetary gear mechanism including a plurality of pinion gears held rotatably and revolvably, and a ring gear meshing with the plurality of pinion gears, wherein the ring gear includes a plurality of low rigidity portions (through holes) having a small section modulus in a radial direction of the ring gear at predetermined intervals in a circumferential direction of the ring gear, and the plurality of teeth of the ring gear include a thermally-treated distortion portion (gear portion) in which an accumulated pitch error based on thermal treatment fluctuates.

5 Claims, 5 Drawing Sheets

PLANETARY GEAR MECHANISM

CROSS-REFERENCE TO RELATED APPLICATION

This application claims priority to Japanese Patent Application No. 2024-126500 filed on Aug. 2, 2024. The disclosure of the above-identified application, including the specification, drawings, and claims, is incorporated by reference herein in its entirety.

BACKGROUND

1. Technical Field

The present disclosure relates to a planetary gear mechanism including a plurality of pinion gears that is rotatably held by a carrier, and at least one of a ring gear and a sun gear with which the pinion gears mesh.

2. Description of Related Art

Japanese Unexamined Patent Application Publication No. 2010-159835 (JP 2010-159835 A) describes a ring gear having external teeth with which a pinion gear meshes. In this ring gear, in order to suppress generation of cyclic sound or vibrations during transmission of rotational force, a plurality of thinned portions is formed at a predetermined pitch in a circumferential direction of a main body portion that is ring-shaped, the thinned portions having different shapes from each other, and thermal treatment is performed. By performing thermal treatment of the ring gear in which the thinned portions that are different from each other are formed at the predetermined pitch in this way, different thermal treatment deformations occur in the circumferential direction, and as a result, the cyclic sound and vibrations in a particular frequency band are suppressed during transmission of the rotational force.

SUMMARY

The ring gear described in JP 2010-159835 A is configured to mesh with one pinion gear. Accordingly, even when the ring gear has a wave form and rotation balance thereof is adjusted, torque being transmitted, i.e., a load acting on tooth flanks, does not change in accordance with meshing positions between the ring gear and the pinion gear. Sound pressure level associated with the meshing of such a pair of gears is of a level that corresponds to the load acting on the tooth flanks, and accordingly even if the cyclic sound and vibrations in a specific frequency band are suppressed, there is a possibility that the sound pressure level itself cannot be reduced.

The present disclosure has been made in light of the foregoing technical problem, and accordingly an object thereof is to provide a planetary gear mechanism in which the overall sound pressure level thereof can be reduced while dispersing the frequency of sound that is generated at each pinion gear.

In order to achieve the above object, the present disclosure is a planetary gear mechanism, including a plurality of pinion gears that is held rotatably and revolvably, and an object gear that meshes with the pinion gears, in which the object gear includes a plurality of low rigidity portions, in which a section modulus in a radial direction of the object gear is small, at predetermined intervals in a circumferential direction of the object gear, and a plurality of teeth of the object gear includes a thermally-treated distortion portion in which an accumulated pitch error based on thermal treatment was changed.

Also, in the present disclosure, the object gear may include a ring gear upon which internal teeth are fashioned, the ring gear may include a flange portion, and a plurality of through holes is opened in the flange portion at predetermined intervals in the circumferential direction, and the low rigidity portions may include a part in which the through holes are opened, on an outer side in the radial direction of the ring gear.

Also, in the present disclosure, the object gear may include a base portion and a gear portion that is fashioned on an outer peripheral face or an inner peripheral face of the base portion, and the low rigidity portions may include a groove that is fashioned on one face out of the outer peripheral face and the inner peripheral face of the base portion that is a face on an opposite side from the gear portion.

Also, in the present disclosure, a count of the low rigidity portions may be determined in accordance with a count of teeth of the object gear.

Also, in the present disclosure, the count of the low rigidity portions may be no less than 10% of the count of teeth of the object gear.

Further, in the present disclosure, the count of the low rigidity portions may be no more than 15% of the count of teeth of the object gear.

According to the present disclosure, there is provided an object gear that meshes with multiple pinion gears, and the object gear includes multiple low rigidity portions having a small section modulus in a radial direction of the object gear, at predetermined intervals in a circumferential direction of the object gear. Teeth of the object gear include a thermally-treated distortion portion in which a cumulative pitch error based on thermal treatment was changed. Accordingly, the load shared by each pinion gear when a planetary gear mechanism transmits torque can be made to vary. Thus, frequency of noise (sound) based on the load acting on each pinion gear can be made to be different, and the noise and vibration of a specific frequency can be suppressed from becoming great. In other words, abnormal noise (sound pressure level) and vibrations that are generated by the planetary gear mechanism can be suppressed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
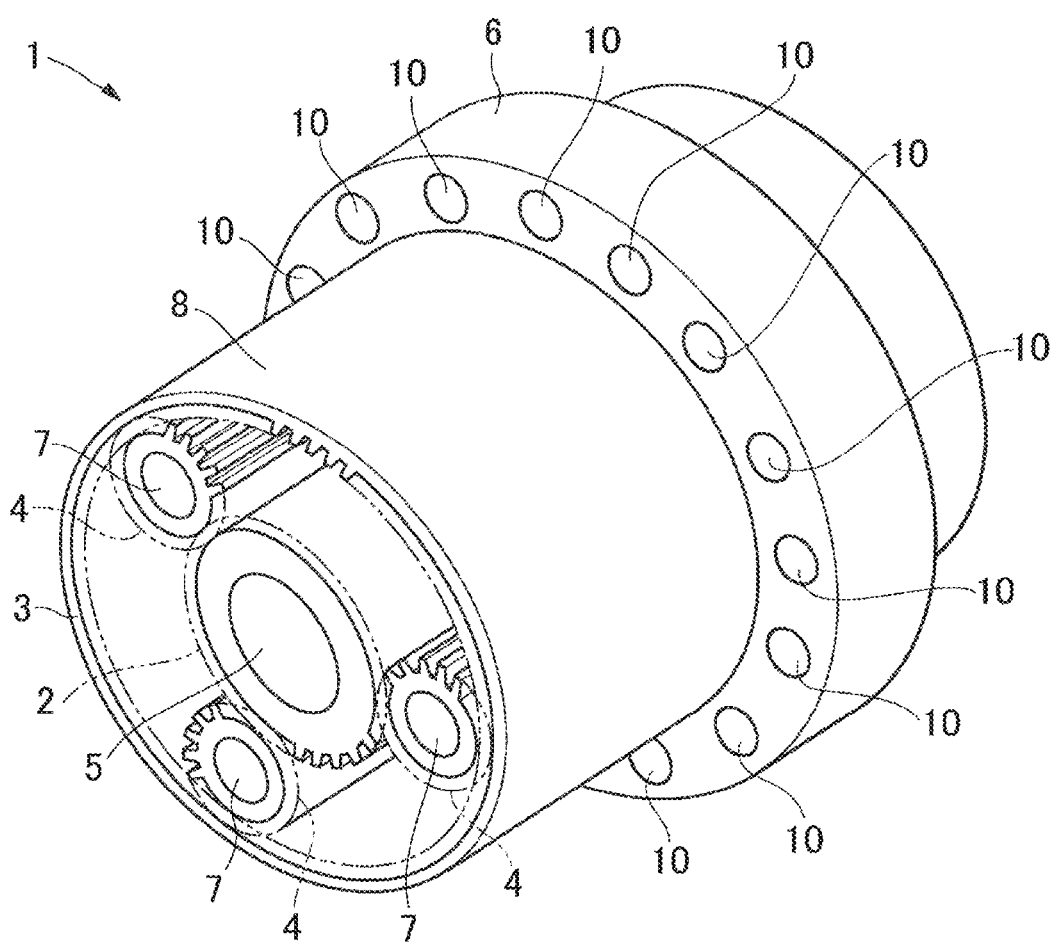
FIG. 1 is a perspective view for explaining an example of a planetary gear mechanism according to an embodiment of the present disclosure.

The present disclosure will be described with reference to the embodiments shown in the drawings. Note that the embodiments described below are merely examples of a case where the present disclosure is embodied, and are not intended to limit the present disclosure.

An example of a planetary gear mechanism in an embodiment of the present disclosure is shown in FIG. 1. The planetary gear mechanism 1 shown in FIG. 1 is a single pinion type planetary gear mechanism including a sun gear 2, a ring gear 3, three pinion gears 4, and a carrier (not shown). The ring gear 3 is arranged concentrically with the sun gear 2 and has internal teeth. The three pinion ring gears 4 mesh with the sun gear 2 and the ring gear 3. The carrier holds the pinion gears 4 rotatably, and also holds the pinion gear 4 so as to be able to revolve around the central axis of the sun gear 2.

The sun gear 2 is integrally rotatably connected to an input shaft 5 to which torque is transmitted from a driving force source (not shown). In the example shown in FIG. 1, the sun gear 2 is formed in a cylindrical shape, and the input shaft 5 is in spline engagement with the sun gear 2. That is, the sun gear 2 is configured to function as an input element.

The ring gear 3 is configured to function as a reaction element. In the example shown in FIG. 1, a flange portion 6 is formed at a predetermined position in the axial direction of the ring gear 3, and the flange portion 6 is configured to be fixed to a fixed portion such as a housing (not shown). The ring gear 3 corresponds to the "object gear" in the embodiment of the present disclosure.

Each pinion gear 4 is formed in a cylindrical shape, and a pinion shaft 7 is provided through the cylindrical portion so as to be relatively rotatable therethrough. Both ends of the pinion shafts 7 are connected to carrier plates (not shown) arranged opposite to each other. One of the carrier plates is connected to an output-side rotating member, an output shaft, or the like (not shown). That is, the carrier is constituted by a plurality of pinion shafts 7 and two carrier plates.

In the planetary gear mechanism 1 configured as described above, the ring gear 3 is fixed and functions as a reaction force element, whereby torque is input from the sun gear 2, so that each pinion gear 4 revolves while rotating. As a result, torque is transmitted to the carrier.

Figure 2:
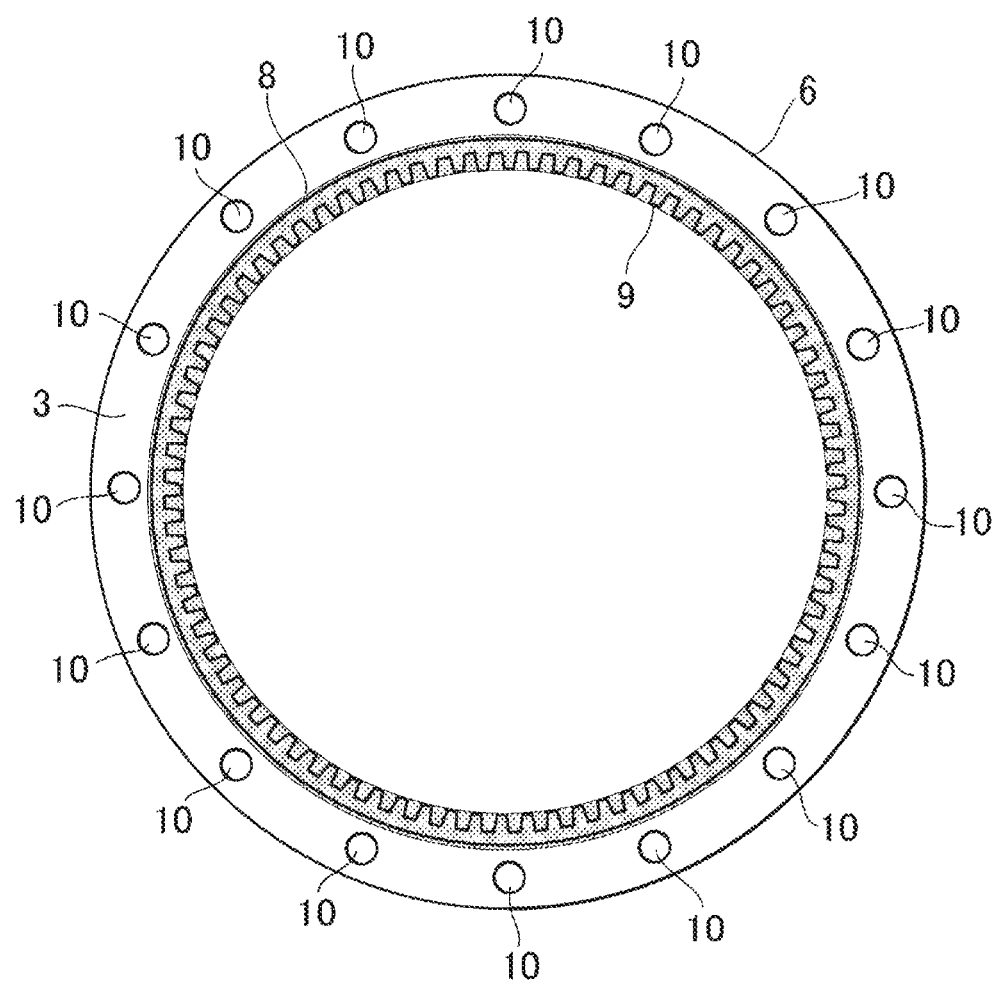
FIG. 2 is a front view for explaining the configuration of the ring gear.

FIG. 2 is a front view for explaining the configuration of the ring gear 3 described above. The ring gear 3 shown in FIG. 2 is an internal teeth gear made of a magnetic material. The ring gear 3 may be a spur gear or a helical gear.

The ring gear 3 shown in FIG. 2 is constituted by a cylindrical base portion 8 and a gear portion 9 formed inside the base portion 8, and the above-described flange portion 6 is formed on the outer peripheral face of the base portion 8. A plurality of through holes 10 are formed in the flange portion 6 at predetermined intervals in the circumferential direction. In the example shown in FIG. 2, sixteen through holes 10 are formed in the circumferential direction of the flange portion 6. The through holes 10 are formed at the same distance from the rotation center axis of the ring gear 3 and have the same inner diameter.

The ring gear 3 described above forms teeth by performing processing such as broaching, tooth cutting, chamfering, and shaving, and forms the through hole 10 in the flange portion 6. Thereafter, the gear portion 9 is subjected to thermal treatment by induction hardening or the like. Specifically, a coil is inserted into the hollow portion of the ring gear 3, and an alternating current is supplied to the coil. By applying an alternating current in this manner, an eddy current is generated in the ring gear 3 made of a magnetic material. Then, the gear portion 9 is heated by Joule heat corresponding to the eddy current, and is subjected to thermal treatment. The time for performing the induction hardening, the hardening conditions such as the magnitude of the current value for energizing the coil is determined based on the strength required in the gear portion 9. In FIG. 2, dots are attached to the hardened layer by the quenching treatment.

By performing the thermal treatment as described above, the radius of the ring gear 3 expands from the inside, and distortion occurs in the ring gear 3. The amount of distortion of the ring gear 3 is an amount corresponding to the rigidity at each portion. In other words, the amount of distortion in the radial direction of the ring gear 3 is an amount corresponding to the section modulus in the radial direction. In the example shown in FIG. 2, a portion in which the through hole 10 is formed in the circumferential direction of the ring gear 3 is a portion having a small section modulus in the radial direction of the ring gear 3, and this portion corresponds to a "low rigidity portion" in the embodiment of the present disclosure.

Therefore, in a portion where the through hole 10 is formed in the circumferential direction of the ring gear 3, the amount of distortion in the radial direction of the ring gear 3 is large, and in a portion where the through hole 10 is not formed, the amount of distortion is small. That is, distortion is generated in the ring gear 3 such that the portion of the gear portion 9 where the through hole 10 is formed on the outside is outside in the radial direction of the ring gear 3 rather than the portion where the through hole 10 is not formed on the outside.

Figure 3:
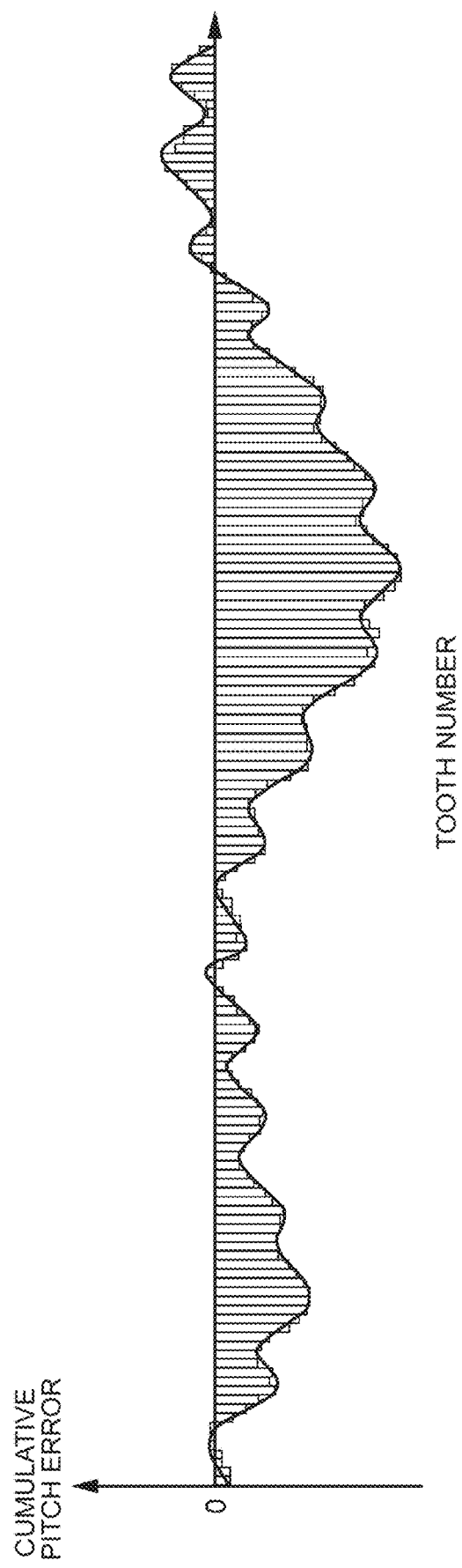
FIG. 3 is a diagram showing the cumulative pitch error of a ring gear subjected to a quenching treatment.

Therefore, the cumulative pitch error of the gear portion 9 after the ring gear 3 is subjected to thermal treatment varies according to the number of the through holes 10 formed in the ring gear 3 as shown in FIG. 3. The gear portion 9 in which the accumulated pitch error fluctuates based on the thermal treatment in this manner corresponds to the "thermally-treated distortion portion" in the embodiment of the present disclosure. The horizontal axis in FIG. 3, the number of teeth counted in the circumferential direction of the ring gear 3 with reference to a predetermined tooth of the ring gear 3, the vertical axis, the cumulative pitch error with reference to the predetermined tooth.

As shown in FIG. 3, in a portion where the through hole 10 is formed outside, the pitch error increases in the negative direction (that is, the actual pitch becomes smaller than the design value). Therefore, when the pinion gear 4 meshes with a portion where the cumulative pitch error is relatively small (a portion where the cumulative pitch error is large in the negative direction), the load acting on the pinion gear 4 (hereinafter, referred to as a shared load) becomes smaller than the shared load when the pinion gear 4 meshes with a portion where the cumulative pitch error is relatively large. That is, for each pinion gear 4, the shared load increases or decreases when the pinion gear 4 rotates and revolves while meshing with the ring gear 3.

Further, each pinion gear 4 meshes and revolves at a predetermined interval in the circumferential direction of the ring gear 3. Therefore, when the shared load of the predetermined pinion gear 4 increases, the shared load of the pinion gear 4 of either one of the other two pinion gears 4 or the other two pinion gears 4 decreases. That is, the total value of the shared loads of all the pinion gears 4 becomes a load corresponding to the torque transmitted from the sun gear 2 to the carrier, and the load is distributed to each pinion gear 4 according to the meshing position with the ring gear 3.

Therefore, the load acting on the predetermined pinion gear 4 fluctuates in the range of the lower order obtained by subtracting the variation order corresponding to the number of the through holes 10 from the meshing order corresponding to the number of teeth of the pinion gear 4 and the upper order obtained by adding the variation order from the meshing order.

Since the noise level generated between the ring gear 3 and the pinion gear 4 is a magnitude corresponding to the load acting on the contact surface, the noise level is reduced when the shared load is small, and the noise level is increased when the shared load is large. On the other hand, the shared load of each pinion gear 4 is different, and the engagement timing thereof, in other words, the generated frequency is different. Therefore, the noise of the plurality of pinion gears 4 does not resonate. As a result, the noise level of the planetary gear mechanism 1 as a whole can be reduced.

Figure 4:
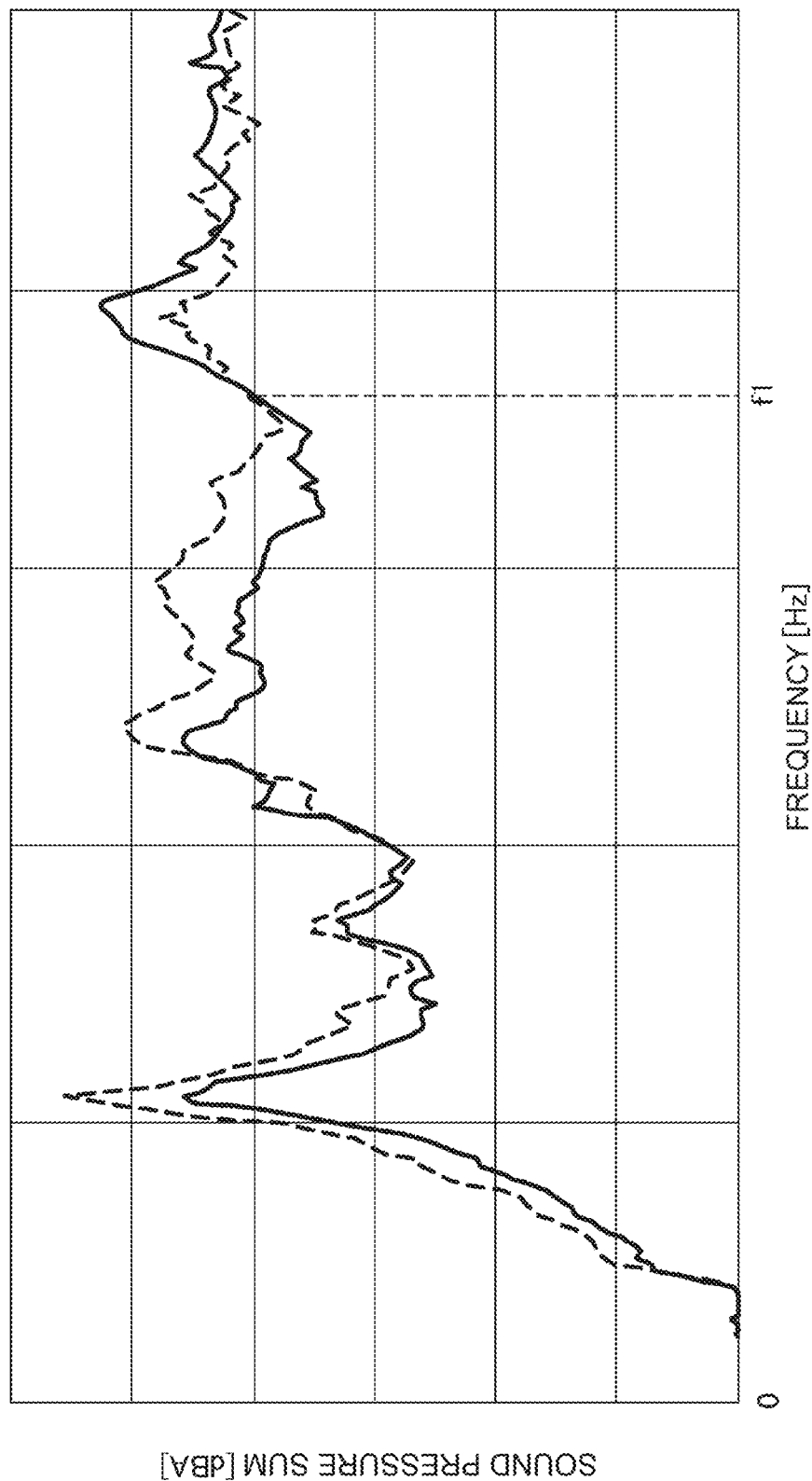
FIG. 4 is a diagram showing a sound pressure sum for each frequency generated when the planetary gear mechanism is operated.

FIG. 4 is a diagram illustrating a result of measuring a sound pressure sum when the sun gear 2 is rotated at a predetermined rotational speed and a predetermined torque is input to the sun gear 2. In addition, FIG. 4 shows the sound pressure sum when the ring gear 3 in which the cumulative pitch error is varied is used as a solid line. Further, in FIG. 4, the sound pressure sum when the ring gear 3 without the cumulative pitch error, in other words, the ring gear without the through hole 10 formed in the flange portion 6 is shown by a broken line. In FIG. 4, the horizontal axis represents the frequency, and the vertical axis represents the sound pressure sum.

As shown in FIG. 4, in the range of the predetermined frequency f1 or less, the sound pressure sum when the ring gear 3 in which the cumulative pitch error is varied is smaller than the sound pressure sum when the ring gear in which the cumulative pitch error is not varied is used.

As described above, the through hole 10 is formed at a predetermined interval in the circumferential direction of the flange portion 6, the cumulative pitch error based on the thermal treatment to adopt the ring gear 3 having a thermally-treated distortion portion (i.e., the gear portion 9) which varies in the planetary gear mechanism 1. As a result, the load shared by the pinion gears 4 can be varied. Therefore, by changing the frequency of the noise, it is possible to suppress the sound and vibration of a specific frequency from becoming large. In other words, abnormal noise and vibration generated from the planetary gear mechanism 1 can be suppressed.

On the other hand, when the difference between the frequencies of two or more sounds is equal to or less than 50 Hz value, the feeling of sound blurring or the feeling of ruggedness may occur, and the sensory function may deteriorate. In addition, the frequency of the sound that the human feels uncomfortable is equal to or higher than 500 Hz. Therefore, in order to make the variation order equal to or greater than 50 Hz, it is preferable that the variation order is 10% or more of the meshing order. Specifically, it is preferable to form the through hole 10 of 10% or more of the number of teeth formed in the ring gear 3.

On the contrary, when the variation order is increased, the variation range of the shared load of the pinion gear 4 is reduced. Therefore, it is preferable to form the through hole 10 of 15% or less of the number of teeth formed in the ring gear 3.

Figure 5:
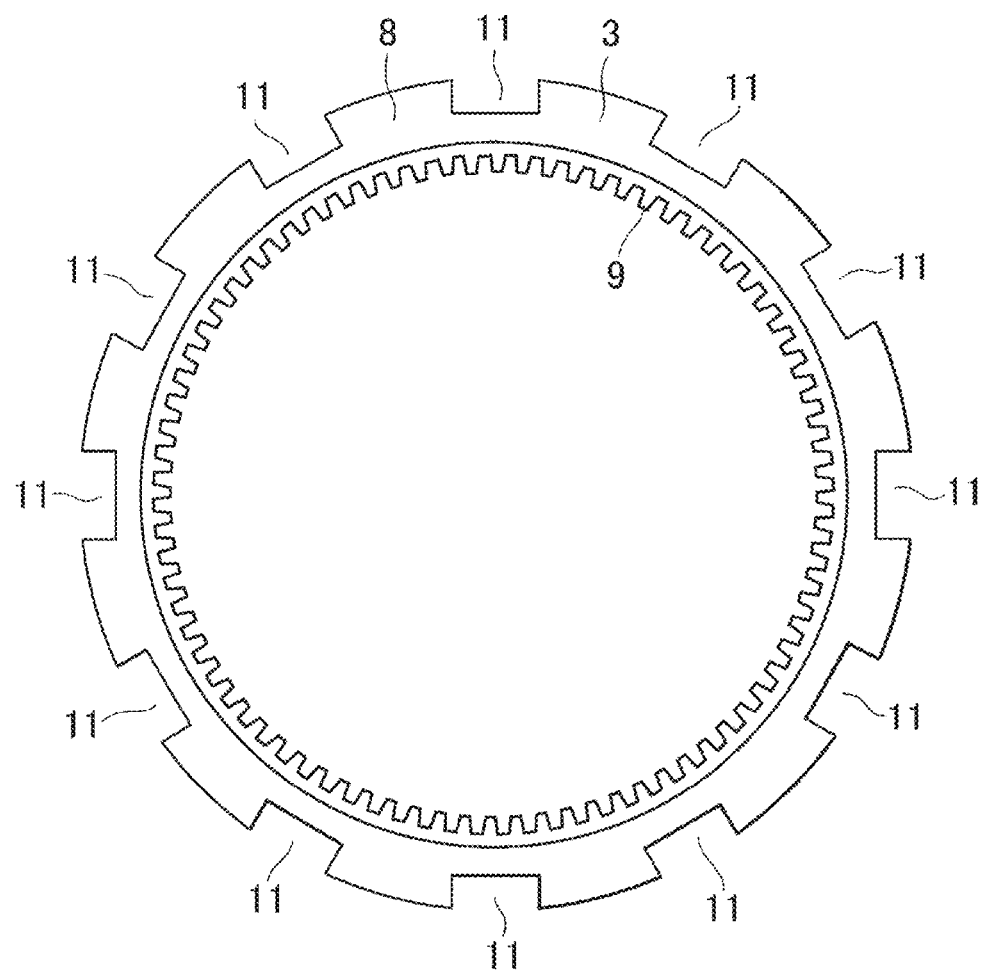
FIG. 5 is a front view for explaining another example of the ring gear.

The planetary gear mechanism in the embodiment of the present disclosure, in order to change the amount of distortion in the thermal treatment may be provided with a gear having a low rigidity portion having a low rigidity (section modulus), the through hole 10 described above is not limited to the ring gear 3 formed in the flange portion 6. Specifically, as shown in FIG. 5, the groove 11 may be formed in the base portion 8 of the ring gear 3 at a predetermined interval in the circumferential direction. The groove 11 may have a rectangular cross section, or may have another shape such as a triangular cross section.

In addition, the planetary gear mechanism in the embodiment of the present disclosure is not limited to the single pinion type planetary gear mechanism described above, and may be a double pinion type planetary gear mechanism in which a plurality of pair of pinion gears of the first pinion gear and the second pinion gear are provided. In the double pinion type planetary gear mechanism, the first pinion gear may mesh with the sun gear, and the second pinion gear may mesh with the first pinion gear and the ring gear. In addition, the planetary gear mechanism in the embodiment of the present disclosure may be a stepped pinion type planetary gear mechanism. The stepped pinion type planetary gear mechanism may include a first pinion gear that meshes with the sun gear, and a second pinion gear that rotates integrally with the first pinion gear and has a different number of teeth from the first pinion gear and meshes with the ring gear.

Further, instead of the configuration in which the cumulative pitch error of the ring gear is varied by forming a through hole or the like in the ring gear, the cumulative pitch error of the sun gear may be varied by forming a through hole or the like in the sun gear. That is, in a sun gear having a disk-shaped or cylindrical base portion and a gear portion on an outer peripheral face thereof, a through hole or a groove may be formed in the base portion. By varying the accumulated pitch error of the sun gear as described above, the shared load acting on the pinion gear from the sun gear can be varied, and the same effects as described above can be obtained.

Still further, the planetary gear mechanism in the embodiment of the present disclosure may be a planetary gear mechanism including only one of a sun gear and a ring gear. For example, the planetary gear mechanism in the embodiment of the present disclosure may be a planetary gear mechanism including a first pinion gear that meshes with the first sun gear, and a second pinion gear that rotates integrally with the first pinion gear and meshes with the second sun gear. For example, the planetary gear mechanism in the embodiment of the present disclosure may be a planetary gear mechanism including a first pinion gear that meshes with the first ring gear, and a second pinion gear that rotates integrally with the first pinion gear and meshes with the second ring gear.

Note that a part of the plurality of through holes 10 described above may be used as a hole into which a bolt for fixing the ring gear 3 to a housing or the like is inserted. In addition, a part of the plurality of grooves 11 illustrated in FIG. 5 may be used as a groove for engaging with a protrusion or the like formed in the fixing portion. In other words, the bolt may not be inserted into the other portion of the plurality of through holes 10, or the other portion of the plurality of grooves 11 may not be engaged with the protrusion or the like of the fixing portion.

What is claimed is:

1. A planetary gear mechanism, comprising: a plurality of pinion gears that is held rotatably and revolvably; and an object gear that meshes with the pinion gears, wherein the object gear includes a plurality of low rigidity portions, in which a section modulus in a radial direction of the object gear is small, at predetermined intervals in a circumferential direction of the object gear, a plurality of teeth of the object gear includes a thermally-treated distortion portion in which an accumulated pitch error based on thermal treatment was changed, the object gear includes a base portion and a gear portion that is fashioned on an outer peripheral face or an inner peripheral face of the base portion, and the low rigidity portions include a groove that is fashioned on one face out of the outer peripheral face and the inner peripheral face of the base portion that is a face on an opposite side from the gear portion.

2. The planetary gear mechanism according to claim 1, wherein the object gear includes a ring gear upon which internal teeth are fashioned, the ring gear includes a flange portion, and a plurality of through holes is opened in the flange portion at predetermined intervals in the circumferential direction, and the low rigidity portions include a part in which the through holes are opened, on an outer side in the radial direction of the ring gear.

3. The planetary gear mechanism according to claim 1, wherein a count of the low rigidity portions is determined in accordance with a count of teeth of the object gear.

4. The planetary gear mechanism according to claim 3, wherein the count of the low rigidity portions is no less than 10% of the count of teeth of the object gear.

5. The planetary gear mechanism according to claim 3, wherein the count of the low rigidity portions is no more than 15% of the count of teeth of the object gear.

* * * * *